(12) United States Patent
Yustick

(10) Patent No.: US 6,872,345 B1
(45) Date of Patent: Mar. 29, 2005

(54) METHOD FOR FORMING A FASCIA ASSEMBLY FOR A MOTOR VEHICLE

(75) Inventor: Robert F. Yustick, West Bloomfield, MI (US)

(73) Assignee: Decoma International Inc., Concord (CA)

(*) Notice: Subject to any disclaimer, the term of this patent is extended or adjusted under 35 U.S.C. 154(b) by 0 days.

(21) Appl. No.: 10/069,184
(22) PCT Filed: Aug. 16, 2000
(86) PCT No.: PCT/CA00/00954
§ 371 (c)(1), (2), (4) Date: Feb. 15, 2002
(87) PCT Pub. No.: WO01/12411
PCT Pub. Date: Feb. 22, 2001

Related U.S. Application Data
(60) Provisional application No. 60/148,692, filed on Aug. 16, 1999.

(51) Int. Cl.[7] .......................... B29C 45/13; B29C 45/14
(52) U.S. Cl. .................. 264/255; 264/250; 264/259; 264/274
(58) Field of Search .................. 264/250, 254–294, 264/328.8; 29/897.15, 897.2, 428; 296/203.02, 193.01; 293/115, 155

(56) References Cited

U.S. PATENT DOCUMENTS

| | | | | |
|---|---|---|---|---|
| 4,414,170 A | * | 11/1983 | Sano | 264/242 |
| 4,702,156 A | * | 10/1987 | Sano | 454/313 |
| 4,766,025 A | * | 8/1988 | Sanok et al. | 428/159 |
| 5,618,485 A | * | 4/1997 | Gajewski | 264/255 |
| 5,695,699 A | * | 12/1997 | Naritomi | 264/46.4 |
| 5,947,511 A | * | 9/1999 | Usui et al. | 280/728.3 |
| 6,126,877 A | * | 10/2000 | Gille et al. | 264/138 |
| 6,136,249 A | * | 10/2000 | Takeuchi et al. | 264/255 |
| 6,551,540 B1 | * | 4/2003 | Porter | 264/255 |

FOREIGN PATENT DOCUMENTS

| | | |
|---|---|---|
| JP | 59146826 | 8/1984 |
| JP | 07164466 | 6/1994 |

* cited by examiner

Primary Examiner—Angela Ortiz
(74) Attorney, Agent, or Firm—Clark Hill PLC

(57) ABSTRACT

The present application discloses a method for forming a fascia assembly that is to be mounted on a front or rear end of a partially completed motor vehicle. The method comprises (1) molding and solidifying a molten first material so as to form an exterior fascia panel having a first connecting portion integrally molded therewith, and (2) molding and solidifying a molten second material so as to form a fascia assembly component having a second connecting portion integrally molded therewith and molded and solidified to the connecting portion of the exterior fascia panel in an interconnected relationship.

6 Claims, 12 Drawing Sheets

METHOD FOR FORMING A FASCIA ASSEMBLY FOR A MOTOR VEHICLE

This application is a 371 of PCT/CA00/00954 filed Aug. 16, 2000, which claims benefit of Provisional 60/148,692, filed Aug. 16, 1999.

FIELD OF THE INVENTION

The present invention relates to a method for forming a fascia assembly for a front or rear end of a motor vehicle. In particular, the present invention relates to a method wherein first and second fascia assembly components are fastened together by a molded interlock.

BACKGROUND OF THE INVENTION

When manufacturing and assembling fascia assemblies for the front or rear end of a motor vehicle, the exterior fascia panel is usually molded by itself and then connected to other fascia assembly components, such as a bumper beam or a grill and headlamp carrier panel, by fasteners such as threaded bolts. To connect the fascia panel to one of the other fascia assembly components in such a manner, the panel and the component are typically molded separately and then brought to an assembly station where bores are drilled into the panel and the component. Then, the drilled bores are aligned and bolts are inserted into the aligned bores and securely tightened with nuts to fasten the panel and component together.

This conventional approach has two primary drawbacks. First, the conventional approach is relatively inefficient. Specifically, molding the panel and component separately and then bringing them together at an assembly station for fastening is time consuming and occupies manpower and other resources that could be eliminated or more efficiently used elsewhere.

The second drawback is that variations in dimensional tolerances between the panel and the component can make it difficult to properly fasten them together using a simple nut/bolt fastening arrangement. That is, when there is misalignment between the holes in the panel and the component, a fastener cannot be easily inserted through the holes. Instead, the holes on either the panel or the component must be widened by further drilling or the like to ensure that the bolts can pass through the holes. These widened holes are undesirable because, even though they allow the panel and the component to be fastened together, they also allow for relative movement between the panel and the component. This can create visible misalignments when the component is of the kind that is designed to support an exterior structure (e.g., the grill or the headlamps) in a particular orientation with respect to the fascia panel. Consequently, there exists a need for an improved method of assembling a front or rear end fascia assembly that overcomes these inefficiency and tolerance problems associated with the conventional method.

SUMMARY OF THE INVENTION

It is an object of the present invention to provide a method comprising: (1) molding and solidifying a molten first material so as to form an exterior fascia panel having a first connecting portion integrally molded therewith, and (2) molding and solidifying a molten second material so as to form a fascia assembly component having a second connecting portion integrally molded therewith and molded and solidified to the connecting portion of said exterior fascia panel in an interconnected relationship. The fascia assembly component may be a bumper beam, a pair of transversely spaced apart lamp receiving structures, a carrier panel that mounts the grill and the lamps, a collapsible impact assorting structure, or any other component that connects to the fascia panel.

Connecting the fascia panel and the fascia assembly component in such a manner obviates the need for forming the panel and component separately and then bringing them to an additional assembly station where they would conventionally be secured together using nuts and bolts. Instead, the panel and component are interconnected together by the molded connecting portions. Also, the problems associated with varying dimensional tolerances between the panel and the second fascia assembly component are eliminated because the connecting portions are molded together and are not assembled separately.

It should be understood that the present invention may be practiced using a single mold or using a different mold for each component. A single injection mold using a two-shot process is preferred wherein one molten material is injected into the mold to form either the panel or the component and then another molten material is injected into the mold to form the other of the panel and the component. The use of a single mold is preferred because two operations can be performed at a single station, thereby eliminating costs associated with obtaining and operating an additional mold for the second component.

The order in which the panel and components are molded is also not critical to the principles of the present invention. Either the panel may be molded first or the fascia assembly component may be molded first. In a two-shot, single mold operation the molten material for both the panel and the component may be injected sequentially or simultaneously.

In accordance with a further aspect of the invention, a bore may be formed through the connecting portions of the panel and the fascia assembly component and a pin, a rivet, or other interlocking structure may be inserted through the bore to enhance the interconnection between the two connecting portions. Alternatively, the interlocking structure may be provided as an insert in the mold with the molten material being molded around it as the panel and component are being formed. The use of an interlocking structure is not essential to the principles of the present invention, but enhances the interconnection between the panel and the fascia assembly component by preventing separation between the connecting portions. When the fascia assembly is installed on the vehicle, the strength of the interconnection is usually not significantly important because the fascia panel and the fascia assembly component will typically be connected to points on the vehicle body or frame and thus an interconnection is not necessary to keep the fascia panel and the fascia assembly component from separating. However, the interconnection between the panel and the second fascia assembly component is relatively important prior to mounting the fascia assembly to the vehicle, especially during transport and handling of the fascia assembly. Thus, this pin, or any other type of interlocking insert, is particularly useful in preventing separation of the fascia panel and the fascia assembly component prior to mounting the assembly on the vehicle.

DETAILED DESCRIPTION OF THE PREFERRED EMBODIMENT OF THE INVENTION

Figure 1:
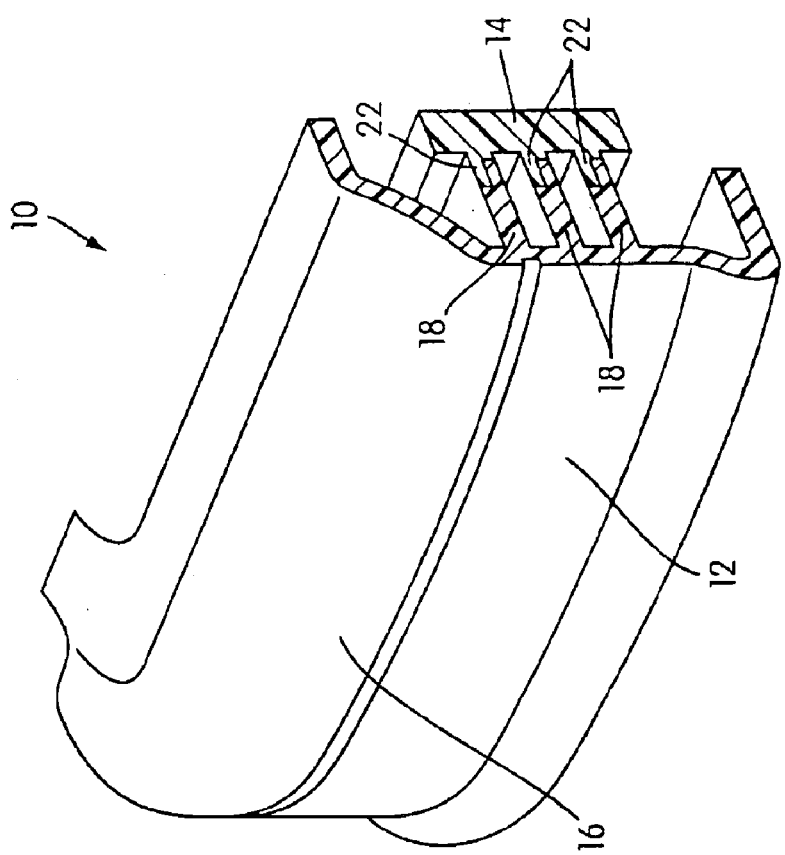
FIG. 1 is a perspective view showing a fascia assembly constructed in accordance with the method of the present invention with an exterior fascia panel of the assembly being interconnected with the bumper beam of the assembly.

FIG. 1 shows a perspective view of a fascia assembly for the front end of a motor vehicle formed using the method of the present invention. The fascia assembly is generally indicated at 10. The exemplary fascia assembly 10 shown in FIG. 1 comprises two basic components. These two components are an exterior fascia panel 12 and a rigid bumper beam 14. The exterior fascia panel 12 constitutes a part of and is connected to the vehicle body when the fascia assembly 10 is mounted to the front end of the motor vehicle. The bumper beam 14 is secured by fasteners, welding, or other suitable attachment means to the frame of the vehicle when the fascia assembly 10 is secured to the front end of the vehicle. When the assembly 10 is mounted to the vehicle, the exterior fascia panel 12 conceals the bumper beam 14 from view.

It can be appreciated from FIG. 1 that the fascia panel 12 is provided with a contoured exterior surface 16 that provides the front end of the vehicle with an aesthetic appearance. The preferred material for forming the fascia panel 12 is a thermoplastic that is somewhat flexible when solidified so as to resist denting, such as thermal polyolefin (TPO).

The bumper beam 14 is formed from a rigid material that resists failure/collapse during an automobile impact, such as a glass-filled thermoplastic. The bumper beam 14 is designed to absorb collision impacts when the assembly 10 is mounted to the front end of the motor vehicle. Because the bumper beam 14 is secured to the vehicle frame, during vehicle impacts the forces absorbed by the bumper beam 14 will be transferred directly to the vehicle frame.

Figure 2:
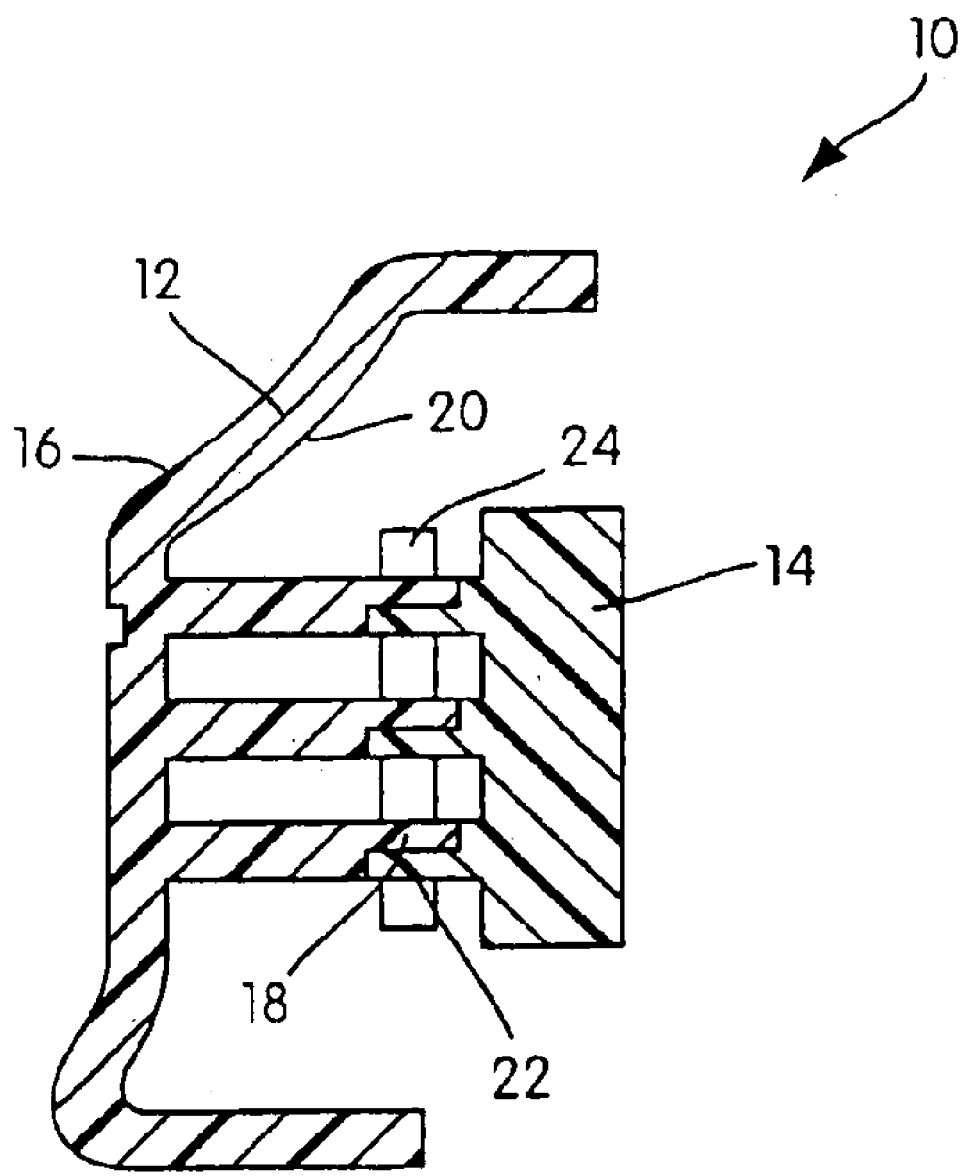
FIG. 2 is a profile view showing the cross-section illustrated in FIG. 1.

It can be best appreciated from FIG. 2 that the exterior fascia panel 12 has a plurality of integrally formed connecting portions 18 (three as shown in FIG. 2) extending rearwardly from the interior surface 20 of the panel 12. Likewise, the bumper beam 14 also has a plurality of integrally formed connecting portions 22 extending forwardly from the front face thereof. These connecting portions 18, 22 are interconnected together as a result of the fascia assembly 10 being constructed in accordance with the method of the present invention. A fastener, rivet, pin, or some other type of interlocking structure 24 may be inserted through the region where the connecting portions 18, 22 of the panel 12 and the bumper beam 14 are interconnected in order to enhance and strengthen the connection between the connecting portions 18, 22.

Figure 3:
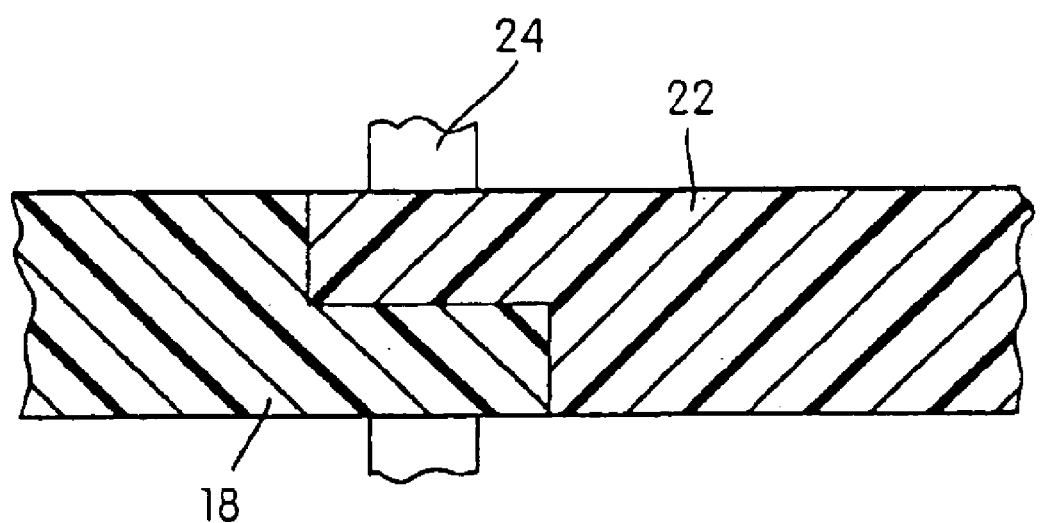
FIG. 3 is a close-up view showing one of the portions where the fascia panel and the bumper beam are interconnected.

Referring to FIG. 3, the connecting portions 18, 22 are shown as overlapping with clean straight lines delineating portion 18 from portion 22 simply to schematically illustrate the connection of connecting portions 18, 22. As will become appreciated from the following description of the method of the present invention, the connecting portions 18, 22 will not be interconnected in such a clean, straight-line manner. Instead, the material defining the connecting portions 18,22 will run together while melted and solidify together to form a bonded connection between the interconnecting portions 18, 22.

Figure 4:
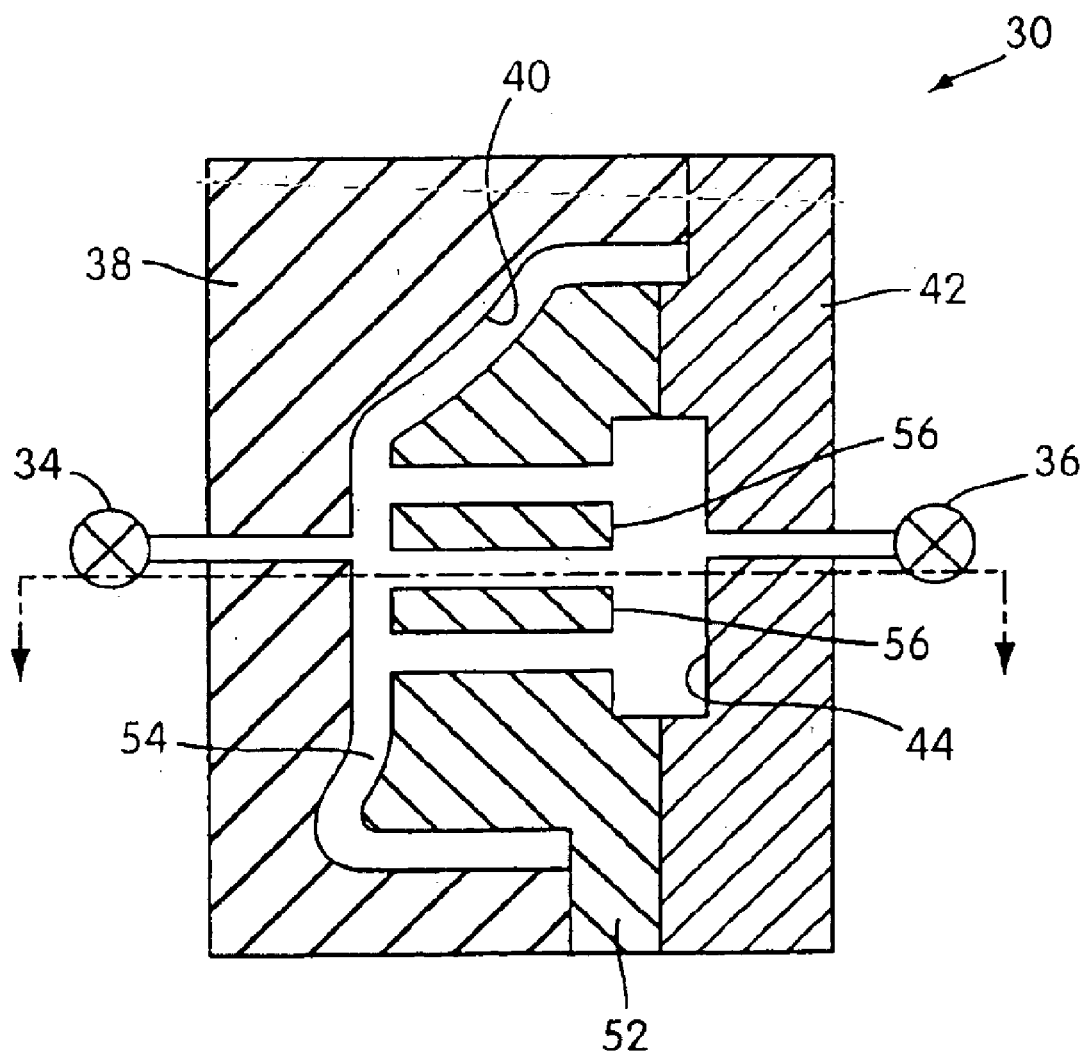
FIG. 4 is a cross-sectional view of an injection molding die assembly used in conjunction with the method of the present invention to perform a two-shot molding operation wherein the bumper beam and the exterior fascia panel are molded and interconnected together.

FIG. 4 shows an injection die assembly 30 which may be used to perform the method of the present invention. The injection molding die assembly 30 is a two-shot molding assembly in which two different molten materials can be injected into the die cavity 32. The gates for controlling the flow of the two materials are shown schematically at 34 and 36. The die assembly 30 comprises four die portions, three of which are shown in FIG. 4. The die portions shown in FIG. 4 include a first die portion 38 that provides an interior surface 40 which has a shape corresponding to the shape of the fascia panel's exterior surface 16. A second die portion 42 is provided opposite the first die portion 38 and has an interior surface 44 with a shape corresponding to the shape of the rear face and upper and lower edges of the bumper beam 14. Each of these die portions 38, 42 have a passageway 46, 48, respectively, formed therethrough and opening to the interior surface 40, 44 thereof. These passageways 46, 48 communicate with gates 34, 36 respectively, so that molded material can be injected into the die cavity through the passageways 46, 48.

Figure 5:
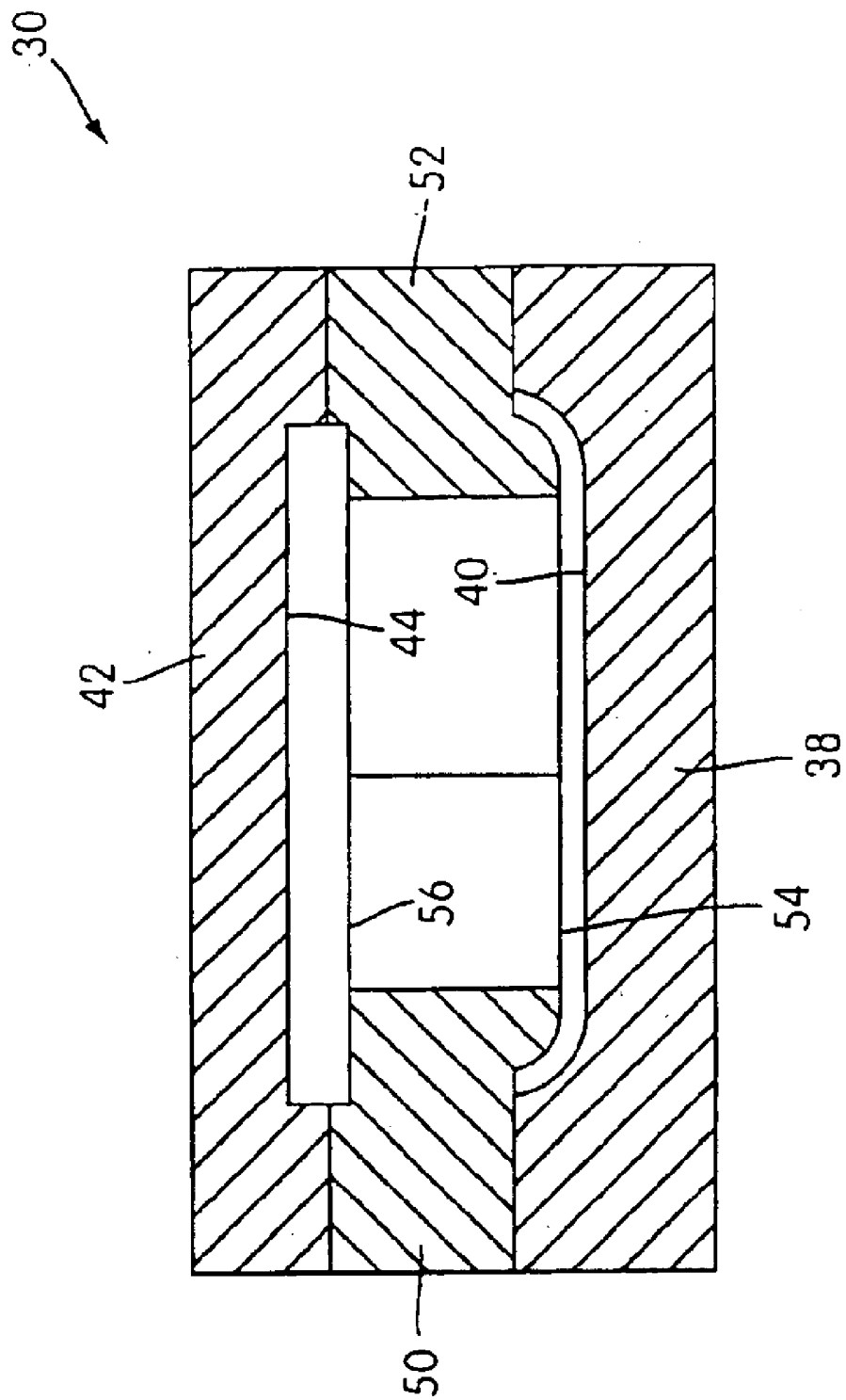
FIG. 5 is a cross-sectional view of the die assembly taken along line 5—5 of FIG. 4.

As best seen in FIG. 5, the die assembly 30 also includes a third die portion 50 and a fourth die portion 52 that are disposed between the first and second die portions 38, 42 when the die assembly 30 is closed and ready for injection. The third and fourth die portions 50 and 52 cooperate to provide a surface 54 that has a shape corresponding to the shape of the interior surface 20 of the fascia panel 12, and a series of surfaces 56 (best seen in FIG. 4) that cooperate to define the portions of the bumper beam's front face that are located between the connecting portions 22. The third and fourth die portions 50, 52 also provide a series of surfaces 58 that cooperate to define portions 60 of the die cavity that extend through the third and fourth die portions 50, 52 between surfaces 54 and 56. As will be appreciated below, these die cavity portions 60 are the areas where the connecting portions 18, 22 are formed, molded and solidified together. Together, surfaces 40, 44, 54, 56, and 58 cooperate together when the die assembly 30 is closed to form a die cavity 62 in which the fascia panel 12 and the bumper beam 14 will be molded and solidified together.

Figure 6:
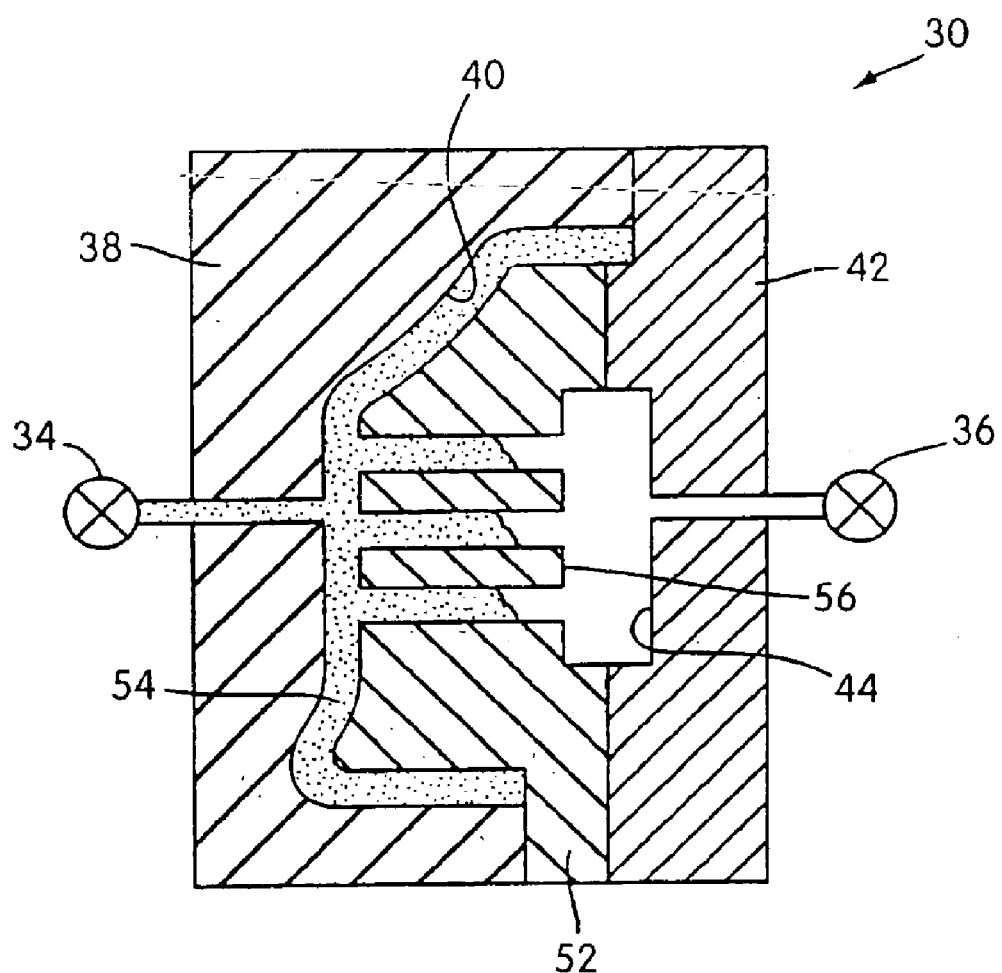
FIG. 6 show the injection molding die assembly of FIG. 5 with a first molten material being injected therein to form the exterior fascia panel.
Figure 7:
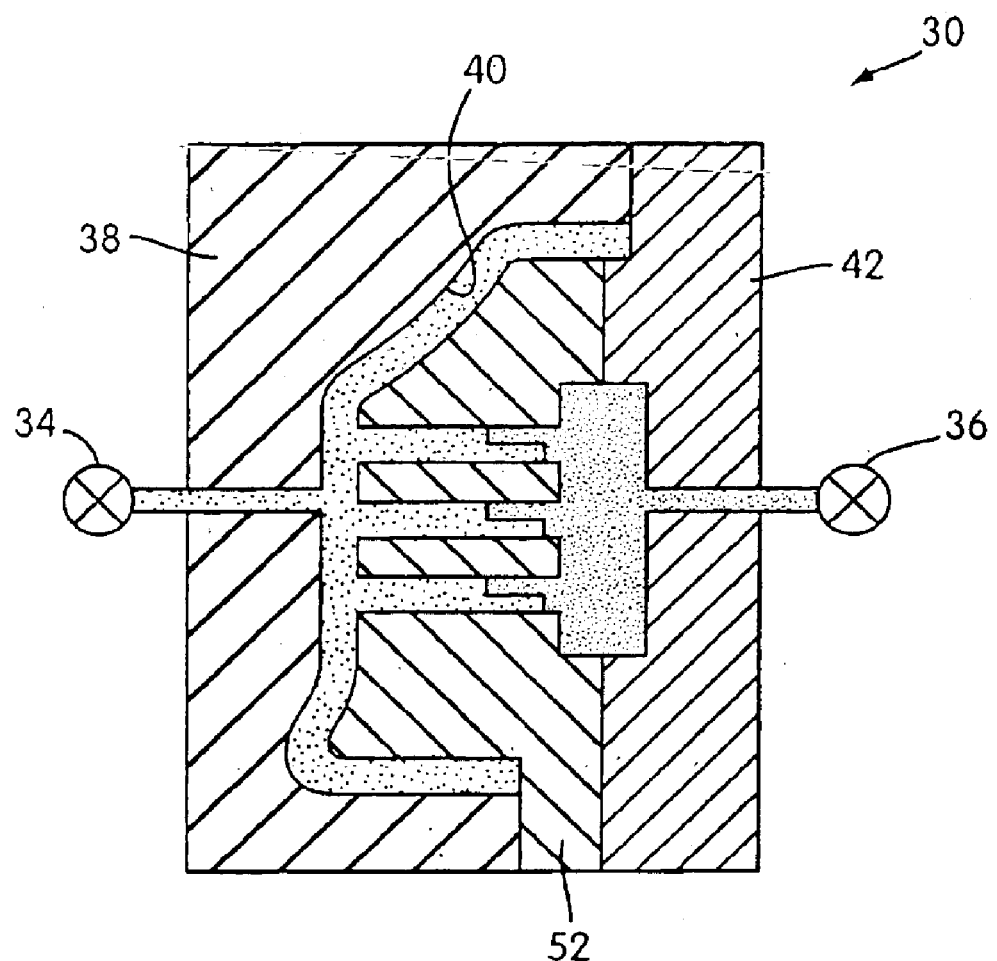
FIG. 7 shows the injection molding die assembly of FIG. 5 with a second molten material being injected into the assembly to form the bumper beam after the first molten material has been injected as shown in FIG. 6.

Turning now to FIGS. 6 and 7, the method of the present invention will now be described. FIG. 6 shows the mold assembly 30 in its sealed, operative position with all four die portions moved into place. This is accomplished by bringing the third and fourth die portions 50, 52 together in the lateral direction of the assembly 30 (left and right as viewed in FIG. 56) and then moving the first and second die portions 38, 42 into sealed operative engagement with the third and fourth die portions 50, 52 to the position shown in FIG. 6. Then, as is conventional in the molding art, a vacuum is applied to draw the air out from the die cavity 62. This prevents bubbles from forming in the final, molded product.

Next, gate 34 is opened and a first molten material 64 is injected into the die cavity 62 through passageway 46. This first molten material 64 fills the portion of the die cavity 62 that forms the fascia panel 12 and partially fills the portions 60 that form the connecting portions 18 and 22. It is to be understood that gate 34 is provided to schematically show this first injection step. To better ensure that upper and lower portions of the mold cavity are filled before portions 60, a pair of gates communicated at the upper and lower ends of the first die portion 38 may be used instead of the single gate 34.

The first gate 34 is then closed and the second gate 36 is opened and a second molten material 66 is injected into the die cavity 68 through passageway 48. This second material fills the portion of the die cavity 62 that forms the bumper beam 14 and fills the remainder of the portion 60 that defines the connecting portions 18, 22. Finally, the first and second molten materials 64, 66 are allowed to solidify and the die assembly 30 can then be opened and the fascia assembly 10 can be removed therefrom. It can be appreciated that the first and second molten materials 64, 66 come together in the die cavity portions 60 to form the connecting portions 18, 22. At the area where the connecting portions 18, 22 meet, the first and second materials 64, 66 intermix and bond together to form an interconnection between the connecting portion 18, 22 when solidified.

It should be understood that the method of the present invention is not limited to the two-shot method described above. Instead, the fascia panel 12 and its connecting portions 18 may be molded and solidified at one injection molding station and then brought to a second molding station whereat the panel 12 is placed in a mold and the bumper beam 14 is molded and solidified with its connecting portions 22 molded and solidified to the fascia panel's connecting portions 18.

With either of these methods, interconnecting structures 24 may be used to enhance the bond between the connecting portions 18, 22. The interlocking structure 24 shown in FIGS. 2 and 3 is driven vertically through all three of the regions where the connecting portions 18, 22 meet after the assembly 10 has been solidified and removed from mold assembly 30 (or the second molding station). Alternatively, individual interlocking structures, such as short cylindrical pins, may be molded into each set of connecting portions 18, 22 by placing the interlocking structures into the mold as inserts. For example, a series of these short pins could be placed as inserts into the die cavity portions 60 of die assembly 30 and then the molten materials 64 and 66 can be solidified around these pins. To separate the panel 12 and beam 14 for repair or replacement of the panel or beam (i.e. if one has been damaged during a collision), the interlocking structure 24 can be removed by drilling or the like to facilitate separation. Once separated, the damaged piece can be repaired and reattached or discarded for recycling.

Another alternative to inserting separate pins or other interlocking structures through the connecting portions 18, 22 is to use a mold insert that provides one of the connecting portions 18, 22 with a T-shape or an L-shape and solidifying that shape and then removing the mold insert before injecting the other material. As the other material is injected into the mold, the other material surrounds the solidified T or L-shape. This enhances the interconnection between the interconnecting portions 18, 22 because the manner in which the second injected material surrounds the T or L-shape provides a firm mechanical connection in addition to bonding between the materials.

It is to be understood that the connection between the panel 12 and the beam 14 is provided to ensure that the panel 12 and beam 14 remain connected to one another until the fascia assembly 10 is assembled to the end of the vehicle. At that point, the panel 12 is fastened to the vehicle body and the beam 14 is fastened to the vehicle frame. The interconnection between the panel 12 and beam 14 does not play a role in keeping together during vehicle operation. Instead, the interconnection serves to keep the beam 14 and panel 12 together as a single unit for delivery to the vehicle assembly site and mounting onto the vehicle end.

After the fascia assembly 10 has been molded according to the method of the invention as described above, the exterior visible components associated with the front end of the vehicle (or the rear end if this were a rear end fascia assembly) can be mounted to the fascia assembly 10 and properly oriented. This mounting and aligning may be done manually, but it is preferred to use the methods disclosed in pending International Patent Application No. WO 99/21748. The positioning mold of the above-mentioned application may be used in conjunction with a carrier panel to orient and fix the exterior visible components, which include structures such as the headlamps and the grill. Also, the fascia panel may be provided with positioning features in accordance with the teachings of the above-mentioned application so that the exterior visible components are properly oriented without the use of the carrier panel and then are secured to a carrier panel that is part of the partially completed vehicle during installation of the fascia assembly 10.

It should be understood that the method of the present invention may be practiced without using the teachings of the above-mentioned application. That is, one could form a fascia assembly in accordance with the broad teachings of the present invention and then deliver the same to the vehicle manufacturer, who in turn then mounts the fascia assembly to a partially completed vehicle and thereafter secures the exterior visible components in place. However, it is preferred to construct and ship the entire end module assembly with the fascia assembly formed in accordance with the teachings of the present invention and the exterior visible components mounted and aligned in accordance with the teachings of the above-mentioned application.

Figure 8:
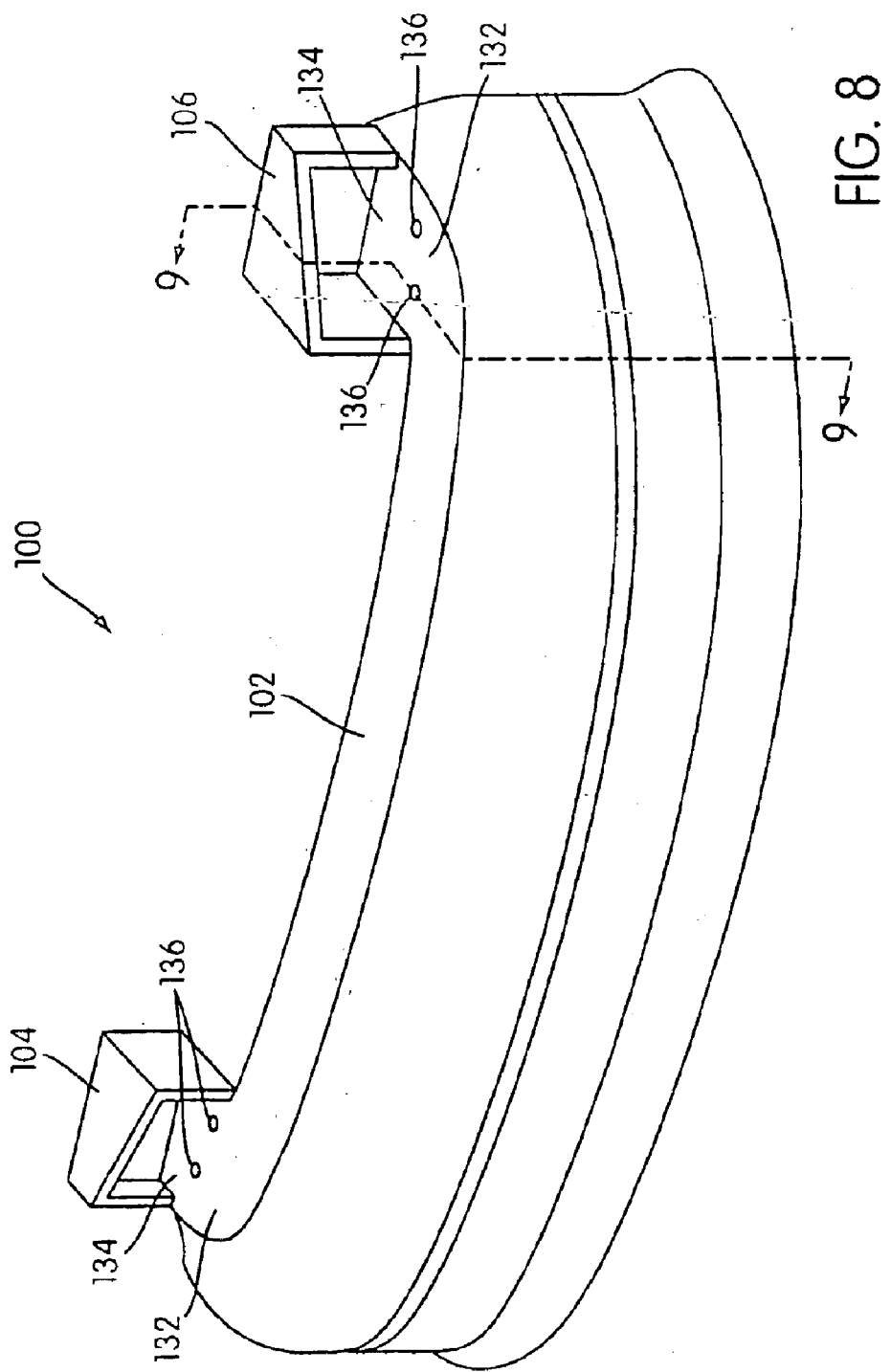
FIG. 8 is a perspective view of another fascia assembly constructed in accordance with the method of the present invention with a head lamp receiving can being interconnected with the exterior fascia panel.
Figure 9:
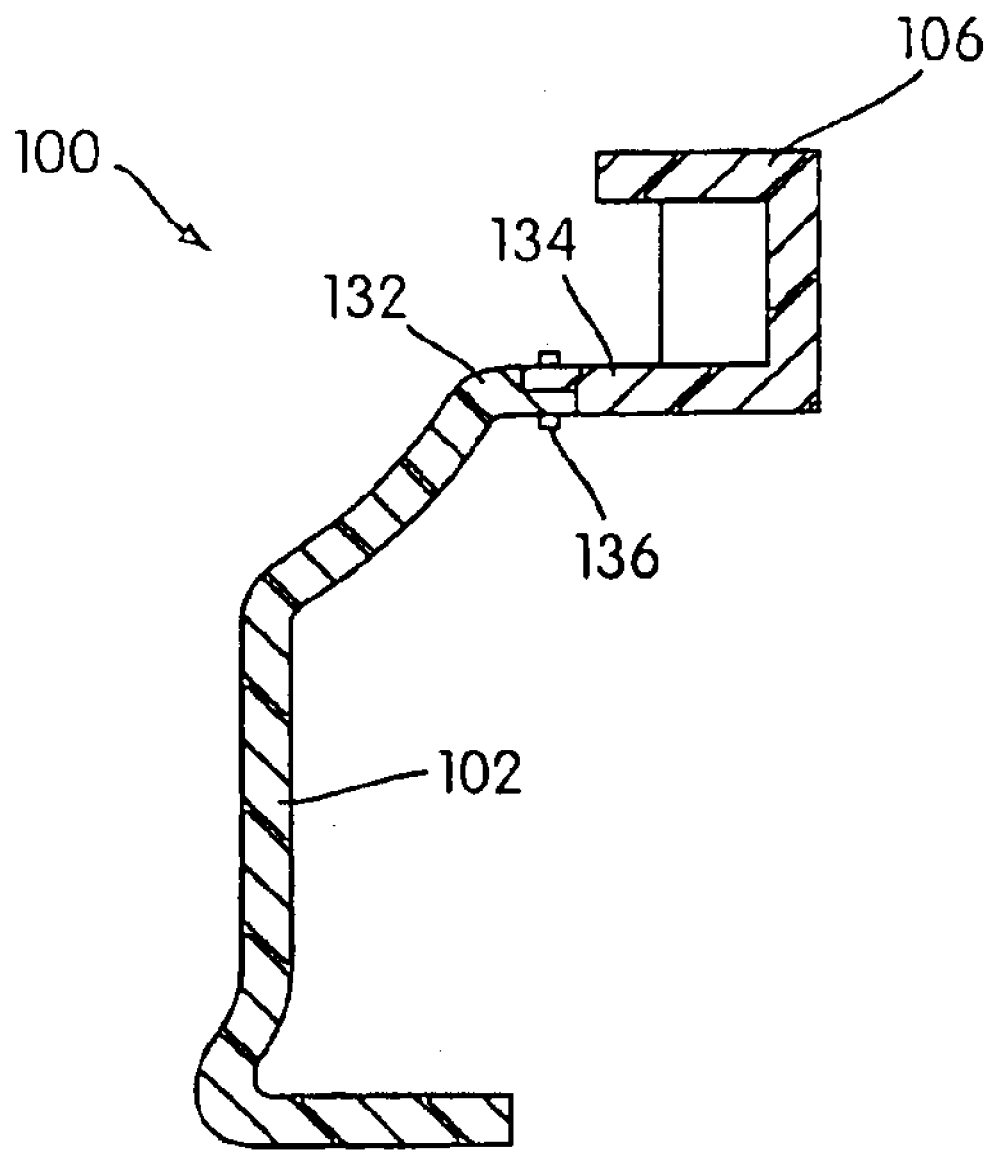
FIG. 9 is a cross-sectional view taken along line 9—9 of FIG. 8.

FIG. 8 shows another fascia assembly 100 constructed by the method of the present invention. The fascia assembly 100 of FIG. 8 has an exterior fascia panel 102 similar to fascia panel 12 and a pair of rigid lamp receiving cans 104, 106 connected on opposing lateral sides of the fascia panel 12. The lamp cans 104, 106 are made of a rigid material, such as ABS or a glass-filled thermoplastic, and are each configured to have the components of a vehicle head lamp mounted therein (i.e., the bulb, reflective backing, transparent cover, etc.) for connection to the electrical system of the vehicle during assembly. The material for the lamp cans 104, 106 is used to protect the lamp components from damage during vehicle operation and to facilitate heat dissipation. Although the lamp cans 104, 106 illustrated have straight side, top and bottom walls, the shape of the cans 104, 106 may take any desired configuration.

Figure 10:
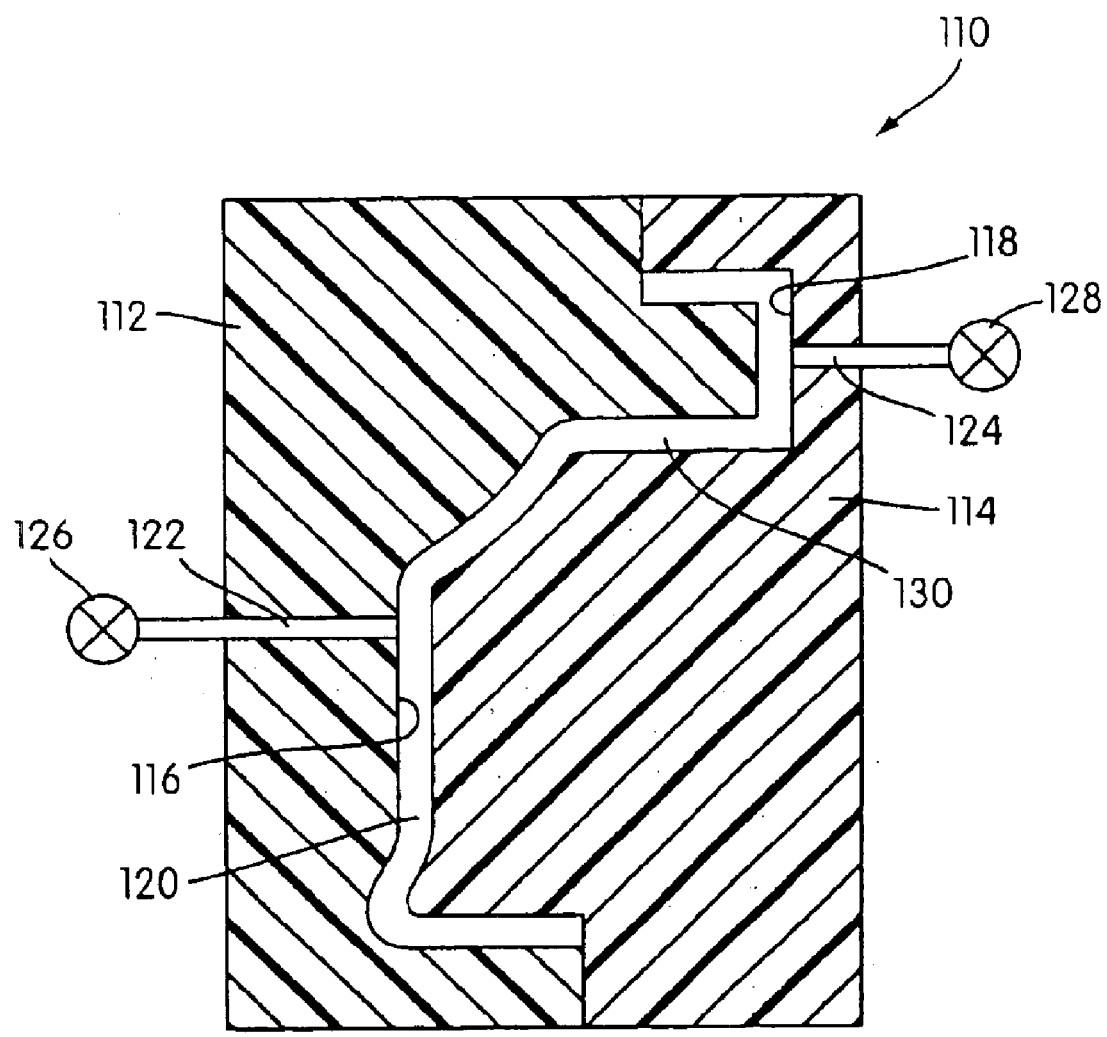
FIG. 10 shows an injection molding die assembly used to mold the assembly of FIG. 8 in a two-shot operation.

To mold the fascia assembly 100, a two-piece injection molding die assembly 110, shown in FIG. 10, is used. Die assembly 110 has two die portions 112, 114 that have interior surfaces 116, 118 that cooperate to form a die cavity 120. The die portions 112, 114 each have a passageway 122, 124 formed therethrough that communicates with gates 126, 128 and opens to the interior surfaces 116, 118.

To mold the fascia assembly 110, the die portions 112, 114 are brought together into their sealed, operative positions (as shown in FIG. 10) and the die cavity 120 is vacuumed. Then, gate 126 is opened to inject a first molten material into the die cavity 120 through passageway 122. The first molten material fills most of the die cavity 120 and forms the fascia panel 102 when solidified. A portion of the first molten material partially fills the area of the die cavity indicated at 130 to provide the panel 102 with a connecting portion 132. Then, gate 126 is closed and gate 128 is opened to inject a second molten material into the die cavity 120 through passageway 124. This second molten material fills the remainder of the die cavity 120 and forms the lamp receiving can 106. A portion of this second molten material fills the remainder of the area indicated at 130 to provide the lamp can 104 with a connecting portion 134. The assembly 100 is then solidified so that the connecting portions 132, 134 are solidified to and interconnected and the assembly 100 is removed from the mold.

As with fascia assembly 10, interlocking structures 136 may be used in fascia assembly 100 to enhance the connection between the connecting portions 132, 134. These interlocking structures 136 may be mold inserts or driven into the connecting portions 132, 134 after solidification.

It should be understood that FIG. 10 is a cross-section of the mold assembly 110 taken along the portion where one lamp receiving can is being formed and the second die portion 114 will have another passageway (not shown) with another gate (not shown) for forming another lamp receiving can simultaneously as the can 106 described with respect to FIG. 10 is being formed.

Using the method of the present invention to interconnect the lamp receiving cans 104, 106 to the fascia panel 102 is particularly advantageous because it ensures that the cans 104, 106 remain fixed and properly aligned with respect to the fascia panel 102 as the fascia assembly 100 is being assembled to the vehicle. Specifically, the interconnection between the cans 104, 106 and the panel 102 prevents spaces from being created between the cans 104, 106 and the panel 102 as a result of misalignment during assembly and ensures that the resultant front end (or rear end) has an aesthetically pleasing appearance.

Figure 11:
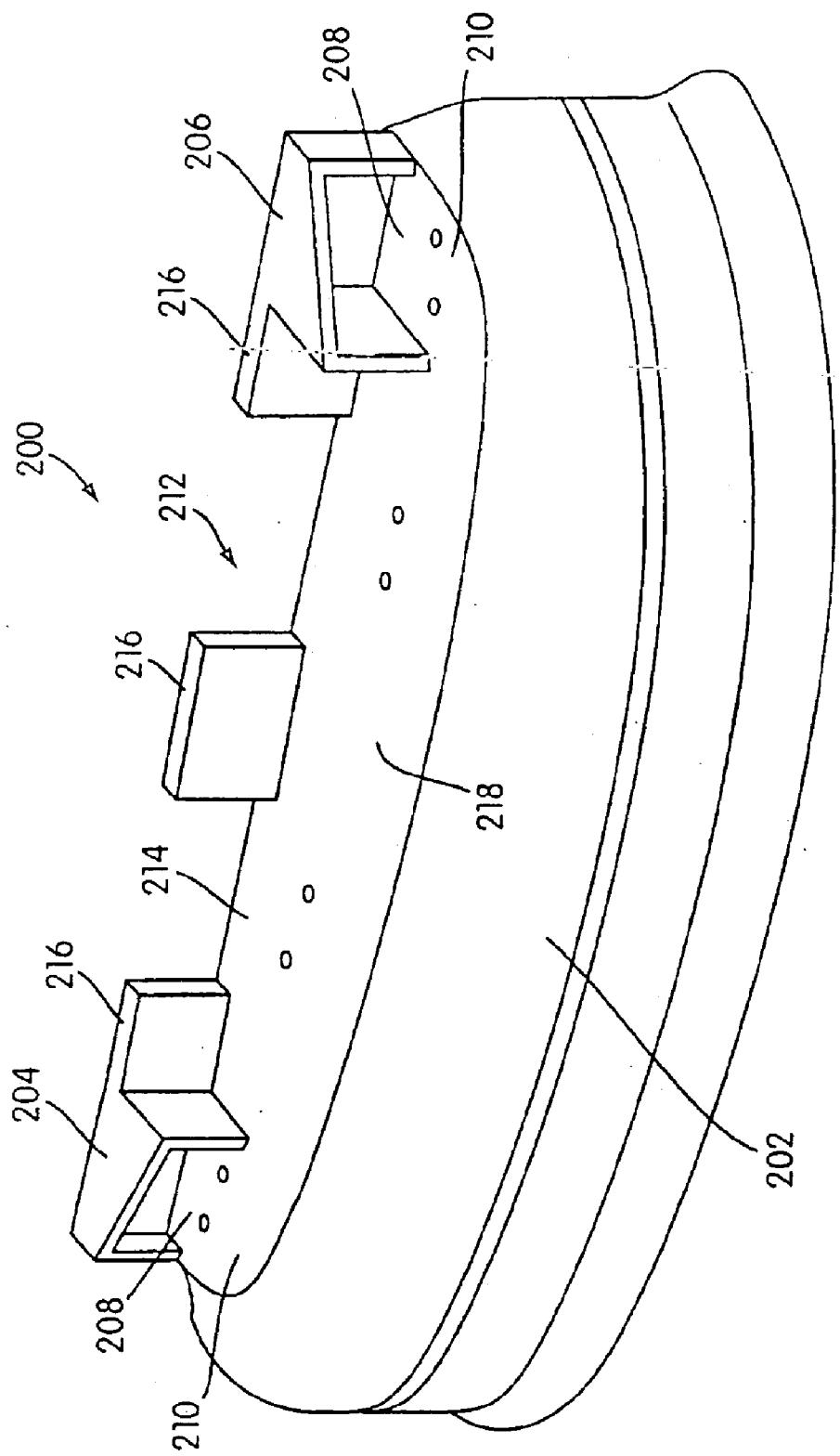
FIG. 11 shows another fascia assembly formed using the method of the present invention with a pair of head lamp receiving cans and a grill opening reinforcement structure.

FIG. 11 depicts yet another fascia assembly 200 formed using the method of the present invention. The fascia assembly 200 is molded in a manner similar to the way in which the fascia assembly 100 was formed. The fascia assembly 200 has a fascia panel 202 formed from a somewhat flexible material to resist permanent deformation when impacted and a pair of rigid lamp receiving cans 104, 106 formed from a rigid material such as a glass filled thermoplastic. The lamp cans 204, 206 have connecting portions 208 molded and solidified to connecting portions 210 of the panel 202 in the same manner as described above.

Between the two cans 204, 206 extends a grill opening reinforcement structure, generally indicated at 212. The reinforcement structure 212 is made from the same material as the lamp cans 204, 206 and has a connecting portion 214 and a series of anchoring structures 216 to which a vehicle grill (not shown) can be fixedly attached. The connecting portion 214 is molded and solidified to a transversely extending central connecting portion 218 on the panel 202. The spaces between the anchoring structures 216 is provided to allow airflow through the grill to the engine compartment during vehicle operation.

The advantage of the assembly of FIG. 11 is that grill can be mounted to the reinforcement structure 216 prior to delivery to the final assembly site and there is no need for an additional carrier panel for mounting the grill and headlamps.

Figure 12:
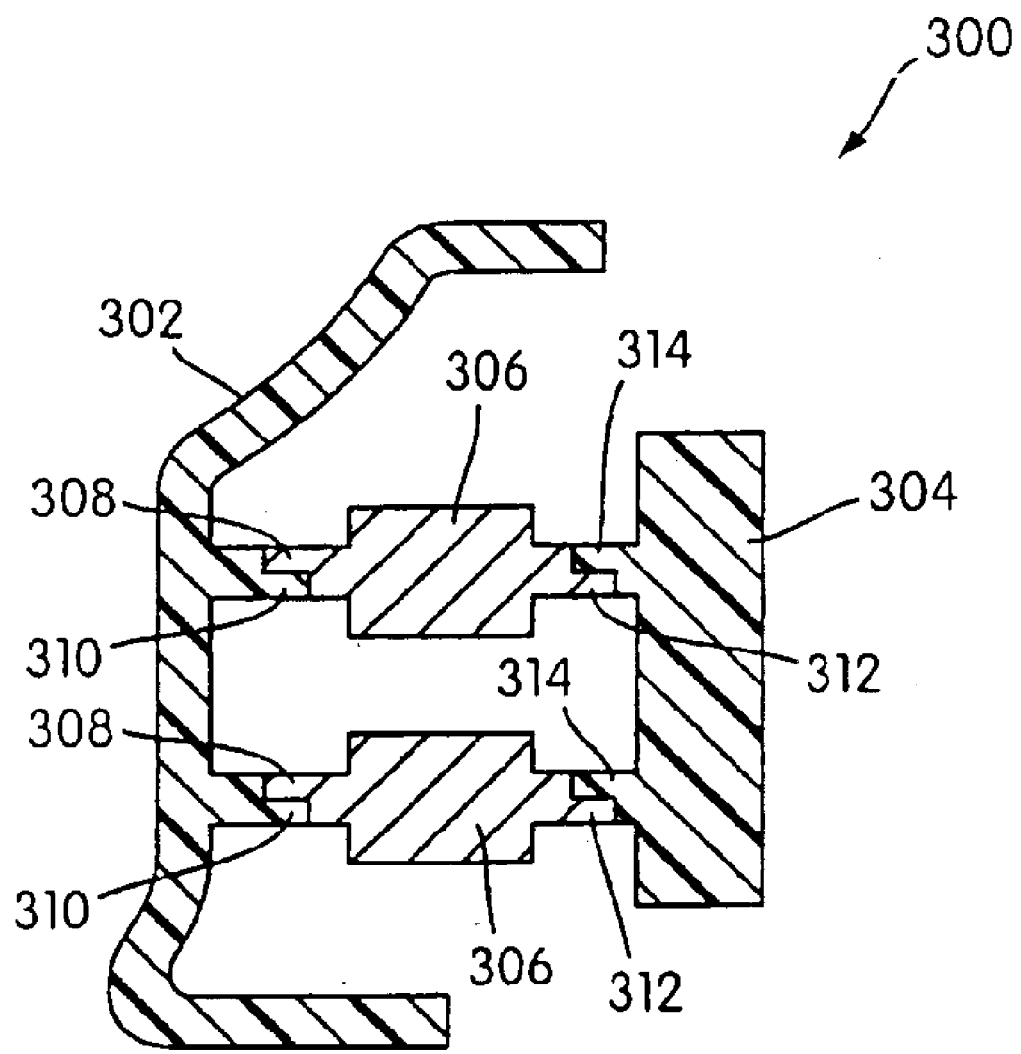
FIG. 12 is a cross-section of yet another fascia assembly formed using the method of the present invention with a series of energy absorbing structures disposed between the panel and the bumper beam.

FIG. 12 shows a cross-section of yet another fascia assembly 300 constructed according to the method of the present invention. The assembly 300 has the fascia panel 302 and the bumper beam 304 with a series of energy absorbing structures 306 disposed therebetween. The energy absorbing structure 306 is molded from a foam or other similar material and is designed to collapse during an automotive impact so as to absorb a portion of the impact's energy and reduce the amount of energy that would otherwise be transferred to the vehicle frame.

Each energy absorbing structure 306 has a first connecting structure 308 molded and solidified to connecting portion 310 of the fascia panel 320. This may be achieved by a two-shot molding operation similar to the ones discussed above or by molding the panel 302 at one molding station and molding the absorbing structures 306 to the solidified panel 302 at another station. Then, after the panel 302 and absorbing structures 306 have been molded and connected together, the bumper beam 304 is molded and solidified so as to interconnect connecting portions 312 from the absorbing structure to connecting portions 314 of the bumper beam 304. It can be appreciated that the operation can be reversed by molding the panel 302 last instead of the bumper beam 304.

It can thus be seen that the objectives of the present invention have been fully and effectively accomplished. It is to be understood, however, that the foregoing specific embodiments have been provided for the purpose of illustrating the principle of the present invention and are not intended to be limiting. To the contrary, the present invention is intended to cover all modifications, alterations, and substitutions within the scope of the appended claims.

What is claimed:

1. A method for forming a fascia assembly that is to be mounted on a front or rear end of a partially completed motor vehicle, comprising:

molding and solidifying molten first material so as to form an exterior fascia panel having a first connecting portion integrally molded therewith, said fascia panel being configured to constitute a portion of a vehicle body assembly when said fascia assembly is mounted on the front or rear end of the partially completed vehicle;

molding and solidifying a molten second material so as to form a fascia assembly component having a second connecting portion integrally molded therewith with said second connecting portion of said fascia assembly component being molded and solidified to said first connecting portion of said exterior fascia panel in a fixed, bonded, and interconnected relationship such that said connecting portions cooperate to interconnect said exterior fascia panel and said fascia assembly component together for subsequent transport and mounting to the partially completed vehicle; and wherein molding and solidifying said molten second material so as to form said fascia assembly component includes molding and solidifying said molten second material so as to form a lamp receiving structure.

2. A method according to claim 1, wherein molding and solidifying said molten second material so as to form a lamp receiving structure includes molding and solidifying said molten second material so as to form a pair of lamp receiving cans that are spaced apart from one another in a transverse direction of said fascia assembly, each of said lamp receiving cans being constructed and arranged to allow a lamp bulb to be mounted therein and electrically connected to an electrical system of the motor vehicle and to allow a lens to be mounted in covering relation with respect to said lamp bulb when said fascia assembly is mounted to the front and rear end of the vehicle.

3. A method for forming a fascia assembly that is to be mounted on a front or rear end of a partially completed motor vehicle, comprising:

molding and solidifying molten first material so as to form an exterior fascia panel having a first connecting portion integrally molded therewith, said fascia panel being configured to constitute a portion of a vehicle body assembly when said fascia assembly is mounted on the front or rear end of the partially completed vehicle;

molding and solidifying a molten second material so as to form a fascia assembly component having a second connecting portion integrally molded therewith with said second connecting portion of said fascia assembly component being molded and solidified to said first connecting portion of said exterior fascia panel in a fixed, bonded, and interconnected relationship such that said connecting portions cooperate to interconnect said exterior fascia panel and said fascia assembly component together for subsequent transport and mounting to the partially completed vehicle; and wherein molding and solidifying said first molten material so as to form said fascia panel includes forming a grill receiving opening in said fascia panel and wherein molding and solidifying said molten second material so as to form said fascia assembly component includes molding and solidifying said molten second material so as to form a grill opening reinforcement structure that extends transversely with respect to said fascia panel, said grill opening reinforcement structure being constructed and arranged to have a grill mounted thereto.

4. A method according to claim 3, wherein molding and solidifying said molten second material so as to form said fascia assembly component including molding and solidifying said molten second material so as to form a pair of lamp receiving cans that are spaced apart from one another in a transverse direction of said fascia assembly on opposing sides of said grill opening reinforcement structure, each of said lamp receiving cans being constructed and arranged to allow a lamp bulb to be mounted therein and electrically connected to an electrical system of the motor vehicle and to allow a lens to be mounted in covering relation with respect to said lamp bulb when said fascia assembly is mounted to the front or rear end of the vehicle.

5. A method for forming a fascia assembly that is to be mounted on a front or rear end of a partially completed motor vehicle, comprising:

molding and solidifying molten first material so as to form an exterior fascia panel having a first connecting portion integrally molded therewith, said fascia panel being configured to constitute a portion of a vehicle body assembly when said fascia assembly is mounted on the front or rear end of the partially completed vehicle;

molding and solidifying a molten second material so as to form a fascia assembly component having a second connecting portion integrally molded therewith with said second connecting portion of said fascia assembly component being molded and solidified to said first connecting portion of said exterior fascia panel in a fixed, bonded, and interconnected relationship such that said connecting portions cooperate to interconnect said exterior fascia panel and said fascia assembly component together for subsequent transport and mounting to the partially completed vehicle; and wherein molding and solidifying said molten second material so as to form said fascia assembly component includes molding and solidifying said molten second material so as to form a collapsible impact absorbing structure, said impact absorbing structure being constructed and arranged to be operatively connected to a frame of the motor vehicle and to collapse when said fascia panel impacts an object during an automotive collision such that said absorbing structure absorbs at least a portion of the energy of the impact and prevents the absorbed portion of energy from being transmitted to the frame.

6. A method according to claim 5, wherein said collapsible impact absorbing structure is molded and solidified so as to integrally mold a third connecting portion with said collapsible impact absorbing structure, and wherein said method further comprises:

molding and solidifying a molten third material so as to form a bumper beam having a fourth connecting portion molded and solidified to the third interconnecting structure of said impact absorbing structure in an interconnected relationship wherein said connecting portion of said bumper beam and said third connecting portion of said collapsible impact absorbing structure interconnect said bumper beam and said impact absorbing structure together, said third material having a greater rigidity than either of said first and second materials when solidified.

* * * * *